United States Patent [19]
Visser

[11] 3,962,663
[45] June 8, 1976

[54] INDUCTIVE POSITION DETERMINING DEVICE

[75] Inventor: Wim Visser, Hilversum, Netherlands

[73] Assignee: U.S. Philips Corporation, New York, N.Y.

[22] Filed: Apr. 5, 1974

[21] Appl. No.: 458,238

[30] Foreign Application Priority Data
Apr. 13, 1973 Netherlands.................. 7305172

[52] U.S. Cl. ............................................. 336/129
[51] Int. Cl.² ........................................ H01F 21/04
[58] Field of Search .......... 336/115, 120, 121, 122, 336/123, 129

[56] References Cited
UNITED STATES PATENTS

| | | | |
|---|---|---|---|
| 2,685,070 | 7/1954 | Childs................................ | 336/123 |
| 2,915,721 | 12/1959 | Farrand et al. ................. | 336/129 X |
| 2,924,798 | 2/1960 | Foster.............................. | 336/129 X |
| 3,064,218 | 11/1962 | Farrand............................ | 336/129 |
| 3,148,347 | 9/1964 | Morrison.......................... | 336/123 |
| 3,181,095 | 4/1965 | Farrand et al. ................. | 336/129 X |
| 3,441,888 | 4/1969 | Farrand........................... | 336/129 X |
| 3,668,587 | 6/1972 | Foster.............................. | 336/129 X |
| 3,732,513 | 5/1973 | Farrand........................... | 336/129 X |
| 3,772,587 | 11/1973 | Farrand et al. ................. | 336/123 X |

Primary Examiner—Thomas J. Kozma
Attorney, Agent, or Firm—Frank R. Trifari

[57] ABSTRACT

Inductive position determining device which comprises a signal winding having meander curves which extend at right angles to the direction in which displacement is determined and two pick-up windings which have corresponding meander curves. The meander curves have a given width and the meander curves of the two pick-up windings show intervals of increased width in which at least one of the meander curves of the other pick-up winding is accommodated. By special proportioning of the limbs of the meander curves the mean medians of the limbs of the two pick-up windings coincide. As a result the position determining device becomes largely insensitive to rotation errors between the carriages on which the signal winding and the pick-up windings respectively are placed.

9 Claims, 6 Drawing Figures

INDUCTIVE POSITION DETERMINING DEVICE

The invention relates to a device for inductively determining the relative position, in one direction, of two carriages. The device commprises a signal winding which can be driven by an alternating current signal and lies in a first plane along the said direction and is secured to the first carriage and has at least one first meander curve, and two pick-up windings which lie in a second plane along the said first plane and are secured to the second carriage and have second meander curves which extend in a direction at right angles to the said direction and are provided with limbs, a position signal being generated in the second meander curves in the case of correspondence with the first meander curve. Such an inductive position determining device is described in U.S. Pat. No. 2,799,835. This device operates as a transformer providing an output signal depending upon the relative position along the said direction of the two carriages. When at least one meander limb of a pick-up winding, which limb extends at right angles to the said direction, lies along at least one corresponding limb of the signal winding the position signal is stronger than when this is not the case. The term "meander curve" is to be understood to mean a curve such as that of the river of this name in which the length of the transverse loop is remarkable and often exceeds the width of the curve taken in the said direction. The curves may be angular. Preferably the windings are arranged in a plane, for example in the form of printed circuits. The value of the signals in the two pick-up windings enables the relative position of the carriages to be determined. If the meander curves of the windings are arranged in a periodic pattern, the signal has a nature which is periodic with the position: the number of periods in the signal indicates the change in position and possibly the rate of this change. Two mutually shifted pick-up windings also enable the direction of change to be determined, for this can be deduced from the phase difference between the two position signals.

With respect to the carriages it is not of importance whether one moves and the other is stationary or both carriages move and whether the movement is in the said direction. The invention may be applied, for example, to machine tools and adjustable read/write arms of magnetic disc stores. A problem arises when the meander curves do not extend exactly at right angles to the said direction or when one of the said two planes is rotated about the said direction as an axis, as will be set out more fully hereinafter.

The invention solves this problem and is characterized in that between periodically arranged second meander curves of a pick-up winding periodically arranged intervals are provided in each of which at least one second meander curve of the other pick-up winding is located, in that groups of corresponding numbers of second meander curves of the two pick-up windings alternate with one another in the said direction, in that the second meander curves of the two pick-up windings are arranged with equal periods but shifted in phase, correspond to curves of the signal winding, and in that the limbs of the second meander curves are proportioned so that their mean medians coincide. Owing to the fact that the medians of the two pick-up windings coincide, a deviation in position as mentioned hereinbefore is insignificant. As a result differential measurements are not materially influenced and in the case of a change of position the mean amplitudes of the position signals are equal, which is of advantage for control purposes. Part of the advantages is obtained by the embodiment described in the said U.S. Pat. No. 2,799,835. The second pick-up winding is divided in two halves arranged one on either side of the first pick-up winding. Thus, however, the meander curves of the signal winding will be very long. Another problem is that effects proportional to the deviation (for example the rotation) can be satisfactorily compensated for, but for example second-order effects proportional to the square of the deviation cannot. The present invention provides a very compact construction, and the coincidence of the medians compensates for effects of any order. Special proportioning of the length of the limbs enables this coincidence of the medians to be effectuated partly only. Whereas hitherto a regular rectangular shape has been used, the invention achieves its object inter alia by specific departures from the regular rectangular shape.

It is an aspect of the invention that the ends of the limb of the second meander curves alternatively lie on one of two lines which extends in the said direction. This is a simple manner of causing the medians to coincide.

It is a further advantageous aspect of the invention that the said numbers at least are equal to 2 and that the intervals between meander curves which belong to the same group are shallower than the intervals between the extreme second meander curves of successive groups of second meander curves of the same pick-up winding. This is another simple manner of obtaining exact coincidence of the medians of the first and second pick-up windings.

Embodiments of the invention will now be described, by way of example, with reference to the accompanying diagrammatic drawings, in which.

Figure 1:
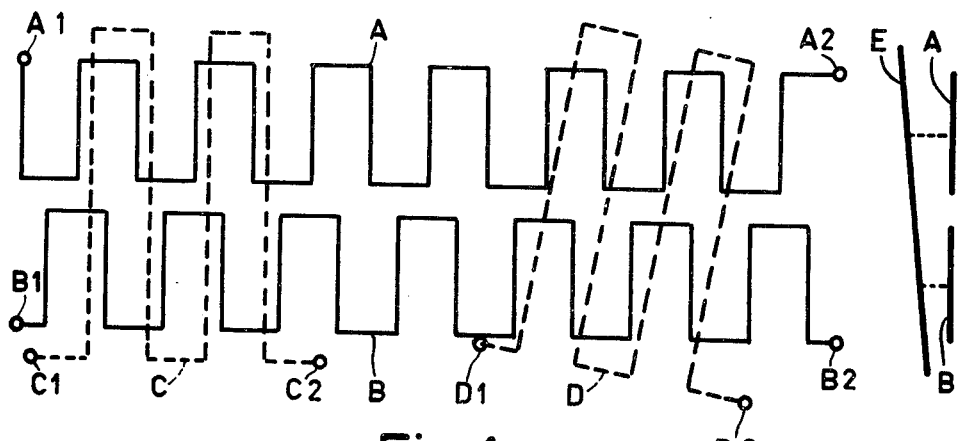
FIG. 1 shows a device according to the state of the art.

Referring now to FIG. 1, the known device comprises a first pick-up winding A having output terminals A1 and A2 and angular meander curves which are downwardly directed at right angles to a line joining the output terminals A1 and A2. The widths of the meander curves and the widths of the intervals between successive meander curves are equal. The first pick-up winding forms a periodic and symmetric pattern having a period of twice the width of a meander curve. Similarly the second pick-up winding B comprises output terminals B1 and B2 and angular meander curves which are upwardly directed at right angles to the line joining the output terminals B1 and B2. The two pick-up windings have the same period and are coplanar, for example in the form of printed circuits. They are relatively shifted through one-fourth period, but may alternatively be, for example, one-sixth or one-third period.

The device further includes a signal winding C having terminals C1 and C2 and angular meander curves upwardly directed at right angles to the line joining the terminals C1 and C2, the period being equal to that of the pick-up windings. In order to indicate that the signal winding, which may also be in the form of a printed circuit, lies in a plane parallel to the plane of the pick-up windings, it is shown by broken lines. The signal winding may be connected to a tone generator, a pulse generator or a square-wave generator. A position signal can be derived from the output terminals by transformer action. When the signal winding is displaced in the direction along the line C1–C2 the position signals are amplitude modulated and are alternatively in phase with and in phase opposition to the alternating signal in the signal generator. When the motion is substantially uniform, the maximum values in the alternating position signals in the pick-up windings show a phase difference. The sign of the phase difference determines the direction of displacement. When the motion is not uniform, its direction may be determined by logical means. Problems arise when the orientations of the signal winding and of the pick-up windings are different because the carriages to which they are secured are relatively rotated. FIG. 1 shows a signal winding D having terminals D1 and D2 which is rotated with respect to the direction between the output terminals A1, A2 and B1, B2 (the rotation axis is assumed to be at right angles to the plane of the pick-up windings). As a result the phase difference between the position signals is changed. The phase difference may be reduced to so small a value as to render determination of the direction of motion impossible, in particular in the case of external disturbances and at high rates of displacement. When the windings are proportioned so that the amplitudes of the position signals in the said direction vary sinusoidally, the zero crossings form a system of well defined positions, for example the radial positions of write tracks on a magnetic disc store. In order to achieve a high write density, these tracks are spaced as closely as possible. When the phase difference of the two signals as a function of the position is not exactly 90°, the tracks have to be spaced more widely, with a consequent decrease in mean write density.

FIG. 1 shows a further signal winding E together with pick-up windings A and B in front elevation: as will be seen, rotation has taken place about an axis parallel to the lines joining the output terminals A1 and B1 to A2 and B2 respectively. Obviously, in this case problems also will arise when the position signal in the pick-up winding B on an average is stronger than that in the pick-up winding A, so that position detection is rendered difficult. Such difficulties occur when the position signals are used in a control loop, for in this case they must be equal. This is obtainable by the use of an attenuator or an amplifier, but such an addition renders the system more complicated and expensive.

Finally rotation is possible about an axis contained in the plane of the windings and extending at right angles to the lines joining the output terminals A1 and B1 to A2 and B2 respectively. In this case the signals in both pick-up windings are equally influenced, which is not inconvenient.

Figure 2:
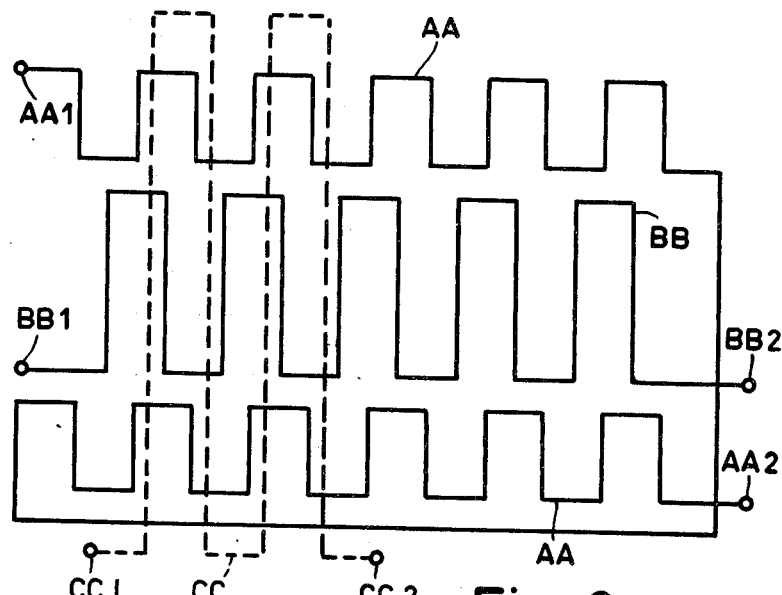
FIG. 2 shows another device according to the state of the art.

FIG. 2 shows another device according to the state of the art. A winding AA performs a function corresponding to that of the winding A of the FIG. 1, and so on. The winding AA comprises two halves, one lying above and the other beneath a winding BB. The dimension in what is the vertical direction in the drawing (at right angles to a line joining the output terminals BB1 and BB2) of the meander curves of the pick-up winding AA always is one half of the corresponding dimension of the meander curves of the pick-up winding BB, so that in a first approximation rotations such as those of the signal windings D and E in FIG. 1 exert little influence. However, for the following reasons this is not always ensured. First of all the pick-up winding BB is centrally disposed while the pick-up winding AA is excentrically disposed. This arrangement requires the shape of the field of the signal in a signal winding CC at right angles to a line joining terminals CC1 and CC2 to be accurately uniform. For this purpose the signal winding CC projects comparatively far beyond the pick-up windings and hence requires considerable space. Furthermore a signal SA at the pick-up winding A (FIG. 1), depending upon the angle $w$ between the two planes, may have the form $$SA = SA0 + SA1 \cdot w + SA2 \cdot w^2 + \ldots$$

The quantities $SA0, SA1 \ldots$ form a sequence of coefficients.

For a signal SB at the pick-up winding B we have:
$$SB = SB0 + SB1 \cdot (-w) + SB2 \cdot (-w)^2 + \ldots$$

In FIG. 2 the pick-up winding AA may be regarded as the sum of two windings, for example the windings A and B of FIG. 1 which are shifted so as to be spatially in phase. When SA and SB are added together the first-order terms cancel each other, but the second order term remains. The same applies to effects due to rotation as shown with respect to the signal winding D of FIG. 1.

Figure 3:
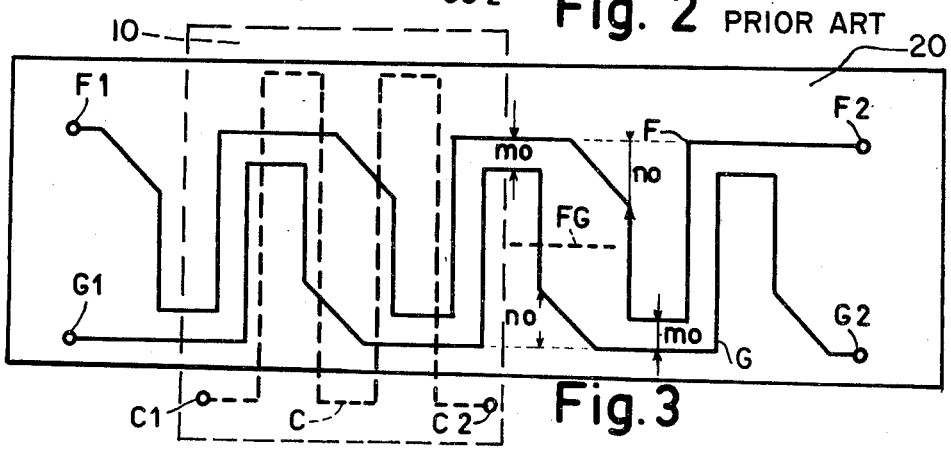
FIG. 3 shows a first device according to the invention.

FIG. 3 shows a first embodiment of a device according to the invention in which the signal winding C is equal to that of FIG. 1 and is secured to a first relatively movable member 10. However, the pick-up windings F and G, which have output terminals F1, F2 and G1, G2 respectively, comprise intervals between the meander curves the widths of which are thrice the width of the meander curves. This arrangement may be considered to the produced in that in FIG. 2 each second meander curve is omitted and the windings are meshed together. The windings F and G are secured to a second relatively movable member 20. The position signals are generated in that the limbs of the signal winding C which extend at right angles to the direction C1, C2 lie alongside corresponding limbs of the meander curves of the pick-up windings F and G. The medians of those limbs of the meander curves which extend in the vertical direction in the Figure coincide in the line FG because the parts which are bevelled over distances $no$ compensate for the effect of the distances $mo$; the bevelled parts of the meander curves cannot correspond with the limbs of the signal winding. The values of $no$ and $mo$ will be discussed hereinafter with reference to FIG. 5.

Figure 4:
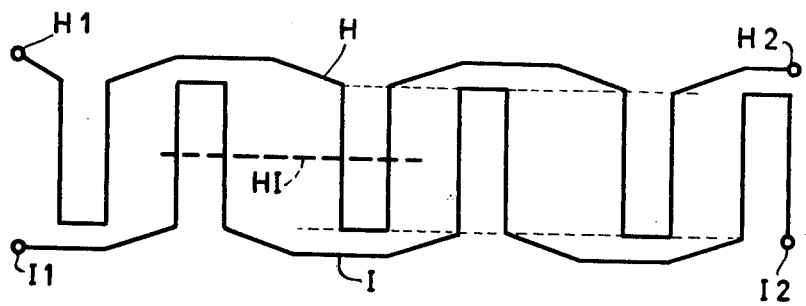
FIG. 4 shows a second device according to the invention.

FIG. 4 shows a second device according to the invention. This may be regarded as produced by the omission from each pick-up winding of two adjacent ones of each three meander curves. This embodiment has the advantage that the smallest distance at which two limbs which extend at right angles to the direction H1–H2 succeed one another is equal to the width of a meander curve, so that the period is comparatively small. If the minimum value of this distance which is obtainable in practice is referred to as $a$, in FIGS. 3 and 4 the periods of the meander patterns are $8a$ and $6a$ respectively. This provides accurate position determination. The connections between successive meander curves of a pick-up winding are bent so that the ends of the limbs always lie on one of two lines which extend parallel to the direction H1–H2. The interconnections extend at right angles to the aforementioned limbs of the signal winding so that they are loosely coupled thereto and provide only a slight contribution to the position signal. In addition the medians (HI) of the limbs of the meander curves of the two pick-up windings now exactly coincide, so that rotations as shown in FIG. 1 have no influence.

Figure 5:
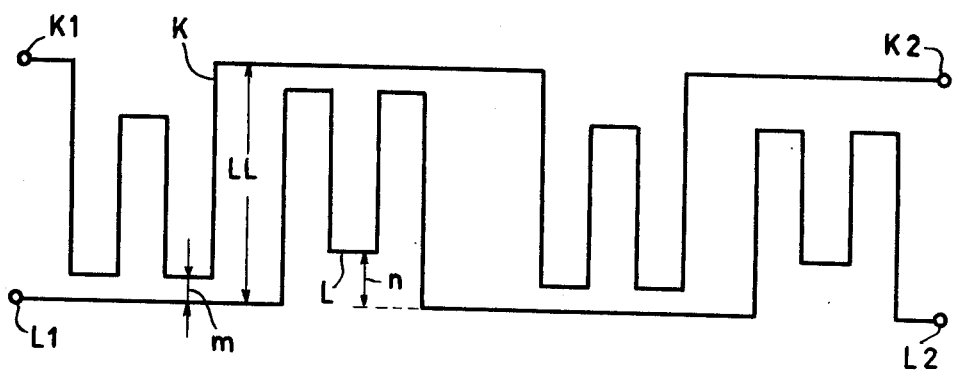
FIG. 5 shows a third device according to the invention.

FIG. 5 shows a third device according to the invention in which, similarly to FIGS. 3 and 4, the medians of the limbs of the meander curves of two pick-up windings K and L coincide. This is achieved in that the first moments, for example with respect to a line joining the terminals L1 and L2, of the two pick-up windings are equal. The first moment then is given as the integral between the beginning and the end of a limb: $\int ldl$, where $l$ is the longitudinal coordinate. For small values of $m$ relative to the distance LL we approximately have: $n/m = 2$ (where $m \leq 0.03$). In the Figure $m/LL$ is equal to 0.1 so that $n/LL$ is about 0.24. When $m/LL$ exceeds about 0.146 no solution is possible. FIG. 5 may be regarded as generated from FIG. 1 by omitting three adjacent ones of each five meander curves in each pick-up winding. To the distances $mo$ and $no$ of FIG. 3 the same calculation applies as to the distances $n$ and $m$ in FIG. 5. In FIG. 3, however, the said distances are not shown to scale.

Figure 6:
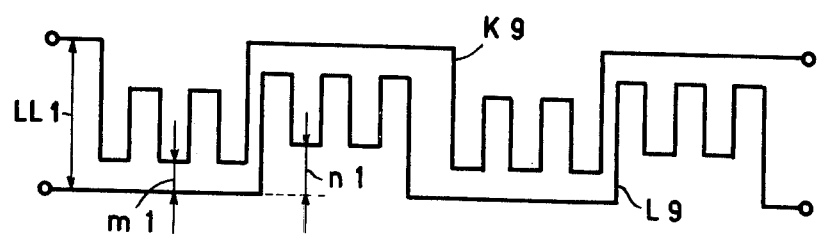
FIG. 6 shows a fourth device according to the invention.

FIG. 6 shows a fourth device according to the invention having two pick-up windings K9 and L9. This Figure may be considered to be generated from FIG. 1 by omitting three adjacent ones of each six meander curves of each pick-up winding. In this case, for small values of $m1/LL1$, for example a value of less than 0.1, the value of $n1$ is given by $n1/m1$, which is about 1½. In the Figure $m/LL1 = 0.2$, so that $n1/LL1$ is about one-third.

According to the invention the configurations illustrated in FIGS. 3 to 6 may be combined.

What is claimed is:

1. An inductive position determining device comprising, first and second members relatively movable in one direction, a signal winding layed out in a first plane along said one direction and secured to the first member and including at least one first meander curve which extends at right angles to said one direction, and two coplanar pick-up windings which lie in a second plane substantially parallel to the first plane and secured to the second member and each having periodically arranged second meander curves with limbs which extend at right angles to said one direction, a position signal being generated in the second meander curves upon correspondence with the first meander curve, characterized in that the periodically arranged second meander curves of a pick-up winding are separated by periodically arranged intervals in each of which at least one second meander curve of the other pick-up winding is accommodated, in that in said one direction groups of corresponding numbers of second meander curves of the two pick-up windings alternate with one another, in that the second meander curves of the two pick-up windings are arranged with equal periods but shifted in phase and correspond to curves of the signal winding, and in that the limbs of the second meander curves are proportioned so that the mean medians of all of said second meander curves coincide, said two pickup windings being the only windings secured to said second member.

2. A device as claimed in claim 1, characterized in that the ends of the limbs of the second meander curves alternately lie on one of two lines which extend in the said one direction.

3. A device as claimed in claim 1, in which the said numbers are at least equal to 2, characterized in that the intervals between meander curves which belong to the same group are shallower than the intervals between the extreme second meander curves of successive groups of second meander curves of the same pick-up winding.

4. A position measuring device comprising first and second members relatively movable in a given direction, the first member including first and second coplanar windings that lie entirely in a first plane, each of said windings comprising a plurality of electrically connected periodically arranged parallel conductor limbs extending transversely to said given direction forming meander curves and having intervening gaps periodically arranged between said limbs along said given direction with conductor limbs of each winding accommodated within a gap of the other winding, said first and second windings having equal periods but being spatially shifted in phase, and wherein the conductor limbs of the first and second windings are arranged and proportioned so that the mean meadians of all said meander curves are colinear, said first and second windings being the only windings attached to said first member, and the second member includes a third winding layed out in a second plane adjacent the first plane so as to provide inductive coupling between the third winding and the first and second windings, said third winding comprising a plurality of electrically connected conductor limbs extending in parallel transversely to said given direction.

5. A measuring device as claimed in claim 4 wherein the conductor limbs of said first and second windings are arranged in groups of equal numbers of conductors that alternate with one another along said given direction.

6. A measuring device as claimed in claim 4 wherein the conductor limbs of the first winding are electrically connected in series and the conductor limbs of the second winding are electrically connected in series.

7. A measuring device as claimed in claim 4 wherein said first and second windings are layed out so that the free ends of the conductor limbs of one winding lie along a first line formed by the base ends of the conductor limbs of the other winding and vice-versa for the free ends and base ends of the conductor limbs of the other winding and the one winding, respectively, which lie along a second line spaced apart from and parallel to said first line.

8. A measuring device as claimed in claim 5 wherein the number of conductor limbs in each group is equal to two and said first and second windings are layed out so that the free ends of the conductor limbs of one winding extend beyond the base ends of the conductor limbs of the other winding and vice-versa.

9. A measuring device as claimed in claim 4 wherein each of said first and second windings includes conductors for interconnecting the conductor limbs of each winding in series circuit, a part of the interconnecting conductors extending at an acute angle to said given direction.

* * * * *